United States Patent
Dell et al.

(10) Patent No.: US 10,113,742 B2
(45) Date of Patent: Oct. 30, 2018

(54) EVAPORATOR BURNER

(71) Applicant: WEBASTO SE, Stockdorf (DE)

(72) Inventors: Vitali Dell, Stockdorf (DE); Klaus Moesl, Stockdorf (DE); Stefan Sommerer, Stockdorf (DE); Thomas Kerscher, Stockdorf (DE)

(73) Assignee: Webasto SE, Stockdorf (DE)

( * ) Notice: Subject to any disclaimer, the term of this patent is extended or adjusted under 35 U.S.C. 154(b) by 231 days.

(21) Appl. No.: 15/127,342

(22) PCT Filed: Mar. 11, 2015

(86) PCT No.: PCT/DE2015/100101
§ 371 (c)(1),
(2) Date: Sep. 19, 2016

(87) PCT Pub. No.: WO2015/139685
PCT Pub. Date: Sep. 24, 2015

(65) Prior Publication Data
US 2018/0180283 A1 Jun. 28, 2018

(30) Foreign Application Priority Data
Mar. 20, 2014 (DE) .................. 10 2014 103 815

(51) Int. Cl.
*F23D 5/12* (2006.01)
*B60H 1/22* (2006.01)
(Continued)

(52) U.S. Cl.
CPC ......... *F23D 5/123* (2013.01); *B60H 1/00264* (2013.01); *B60H 1/2206* (2013.01);
(Continued)

(58) Field of Classification Search
CPC ... F23D 5/123; F23D 2202/00; B60H 1/2209; B60H 1/00264; B60H 1/032;
(Continued)

(56) References Cited

U.S. PATENT DOCUMENTS 1,341,478 A * 5/1920 Platt .................... F02B 9/10
123/193.5
1,604,003 A 10/1926 Ward
(Continued)

FOREIGN PATENT DOCUMENTS

CN 200989585 Y 12/2007
CN 101280922 A 10/2008
(Continued)

OTHER PUBLICATIONS

International Search Report and Written Opinion as dated Jun. 2015 for International Application No. PCT/DE2015/100101.
(Continued)

*Primary Examiner* — Gregory Huson
*Assistant Examiner* — Daniel E Namay
(74) *Attorney, Agent, or Firm* — Quarles & Brady LLP

(57) ABSTRACT

The invention relates to an evaporator burner (1; 101) for a mobile heating device, comprising: a combustion chamber (3), a fuel feed line (4) for feeding liquid fuel, and an evaporator for evaporating fed fuel. The evaporator has a support body (6; 106) made of a nonporous material, comprising a fuel preparation surface (6a; 106a) which faces the combustion chamber (3) and which comes into contact with the liquid fuel. A surface structuring (11) with a plurality of depressions (11a) and elevations (11b) is introduced into the fuel preparation surface (6a; 106a) and/or into a support body (6; 106) rear face (6b; 106b) facing away from the fuel preparation surface.

15 Claims, 6 Drawing Sheets

(51) Int. Cl.
*B60H 1/00* (2006.01)
*B60H 1/03* (2006.01)
*B60H 1/14* (2006.01)

(52) U.S. Cl.
CPC ........... *B60H 1/2209* (2013.01); *B60H 1/036* (2013.01); *B60H 2001/2284* (2013.01); *F23C 2700/026* (2013.01); *F23D 2202/00* (2013.01)

(58) Field of Classification Search
CPC ........ B60H 1/036; B60H 1/14; B60H 1/2206; B60H 2001/2284; F23C 2700/026; F23C 2700/02
USPC ................. 237/12.3 C; 431/7, 170, 242, 260
See application file for complete search history.

(56) References Cited

U.S. PATENT DOCUMENTS

| | | | |
|---|---|---|---|
| 3,502,268 A | 3/1970 | Miskulin | |
| 3,531,229 A * | 9/1970 | Berglund | F23D 3/40 431/158 |
| 4,004,875 A | 1/1977 | Zink et al. | |
| 4,703,888 A | 11/1987 | Kawamura et al. | |
| 5,082,175 A * | 1/1992 | Koch | F23C 7/00 126/110 B |
| 5,090,896 A | 2/1992 | Kenner et al. | |
| 5,350,293 A | 9/1994 | Khinkis et al. | |
| 5,359,966 A | 11/1994 | Jensen | |
| 5,616,021 A | 4/1997 | Onirnaru et al. | |
| 5,947,717 A | 9/1999 | Steiner et al. | |
| 5,993,197 A | 11/1999 | Alber et al. | |
| 7,762,807 B2 | 7/2010 | Linck et al. | |
| 8,573,968 B2 | 11/2013 | Kaupert | |
| 2002/0015930 A1 | 2/2002 | Poe et al. | |
| 2004/0170936 A1* | 9/2004 | Weclas | F23C 99/006 431/7 |
| 2006/0147854 A1 | 7/2006 | Fullemann | |
| 2007/0231761 A1 | 10/2007 | Rosen et al. | |
| 2009/0263757 A1 | 10/2009 | Kaupert | |
| 2010/0092897 A1 | 4/2010 | Wunning et al. | |
| 2011/0173953 A1 | 7/2011 | Neels et al. | |
| 2013/0157206 A1 | 6/2013 | Li et al. | |
| 2014/0186782 A1 | 7/2014 | Eberspach et al. | |
| 2014/0346242 A1* | 11/2014 | Jozinovic | F23C 7/004 237/32 |
| 2017/0153026 A1 | 6/2017 | Dell et al. | |

FOREIGN PATENT DOCUMENTS

| | | | |
|---|---|---|---|
| CN | 201129723 Y | 10/2008 | |
| CN | 201636854 U | 11/2010 | |
| CN | 201786438 U | 4/2011 | |
| CN | 102200279 A | 9/2011 | |
| CN | 202813362 U | 3/2013 | |
| DE | 19 18 445 A1 | 10/1970 | |
| DE | 28 12 960 A1 | 10/1978 | |
| DE | 34 03 972 A1 | 8/1985 | |
| DE | 3923238 A1 | 1/1991 | |
| DE | 43 04 057 A1 | 8/1994 | |
| DE | 195 29 994 A1 | 5/1996 | |
| DE | 195 48 223 A1 | 6/1997 | |
| DE | 197 03 555 A1 | 8/1998 | |
| DE | 198 21 672 A1 | 11/1999 | |
| DE | 101 20 027 A1 | 4/2002 | |
| DE | 101 51 617 A1 | 5/2003 | |
| DE | 102 00 524 C1 | 6/2003 | |
| DE | 102 19 633 C1 | 12/2003 | |
| DE | 102004022302 A1 | 12/2005 | |
| DE | 44 47 987 B4 | 3/2006 | |
| DE | 10 2004 049902 A1 | 4/2006 | |
| DE | 10 2006 031867 A1 | 1/2008 | |
| DE | 10 2011 087971 A1 | 6/2012 | |
| EP | 1 519 110 A1 | 3/2005 | |
| EP | 1 860 379 A2 | 11/2007 | |
| JP | S5364831 A | 6/1978 | |
| JP | S57174607 A | 10/1982 | |
| JP | 61188217 A * | 8/1986 | |
| JP | 05024430 A * | 2/1993 | |
| JP | H0749104 A | 2/1995 | |
| JP | H10246408 A | 9/1998 | |
| JP | 2000018520 A | 1/2000 | |
| JP | 2004156898 A * | 6/2004 | ........... B60H 1/2203 |
| JP | 2004163090 A * | 6/2004 | ............... F23D 3/40 |
| KR | 101278280 B1 | 6/2013 | |
| RU | 2213298 C1 | 9/2003 | |
| RU | 48619 U1 | 10/2005 | |
| WO | 2012149928 A1 | 11/2012 | |
| WO | 2012155897 A1 | 11/2012 | |
| WO | 2013104349 A1 | 7/2013 | |
| WO | 2013127393 A1 | 9/2013 | |
| WO | 2015 014338 A1 | 2/2015 | |

OTHER PUBLICATIONS

European Patent Office, Machine-Generated English Language Translation of DE 19529994, dated Jun. 11, 2018, 13 pages.
European Patent Office, Machine-Generated English Language Translation of EP 1860379, dated Jun. 11, 2018, 10 pages.
European Patent Office, Machine-Generated English Language Translation of DE 10200524, dated Jun. 13, 2018, 7 pages.
European Patent Office, Machine-Generated English Language Translation of DE 4447987, dated Jun. 12, 2018, 23 pages.
European Patent Office, Machine-Generated English Language Translation of DE 4304057, dated Jun. 13, 2018, 6 pages.

* cited by examiner

EVAPORATOR BURNER

CROSS-REFERENCE TO RELATED APPLICATIONS

This application represents the national stage entry of PCT International Application No. PCT/DE2015/100101 filed Mar. 11, 2015, which claims priority of German Patent Application 10 2014 103 815.0 filed Mar. 20, 2014, the contents of which are hereby incorporated herein by reference for all purposes.

The present invention relates to an evaporator burner for a mobile heating device, having a combustion chamber, a fuel supply line for the supply of liquid fuel, and an evaporator for the evaporation of supplied fuel.

Evaporation burners of said type are used in particular in vehicle heating devices which are designed as engine-independent heating devices or auxiliary heating devices for vehicles. Here, an auxiliary heating device is to be understood to mean a heating device which is designed to additionally provide heat during the operation of the drive engine of the vehicle. An engine-independent heating device is to be understood to mean a heating device which is designed such that it can provide heat both during the operation of the drive engine of the vehicle and when said drive engine is at a standstill. Such vehicle heating devices may in this case be designed for example as so-called air-type heating devices, in the case of which the released heat is transferred, in a heat exchanger, from hot combustion exhaust gases to air to be heated, or as so-called liquid-type heating devices, in which the released heat is transferred, in a heat exchanger, from the hot combustion exhaust gases to a liquid, which may be formed in particular by cooling liquid in a cooling liquid circuit of the vehicle.

In the present context, a "mobile heating device" is to be understood to mean a heating device which is designed and correspondingly adapted for use in mobile applications. This means in particular that said heating device is transportable (possibly fixedly installed in a vehicle or merely accommodated therein for transportation) and is not designed exclusively for permanent static use, such as in the case, for example, of a heating system of a building. Here, the mobile heating device may also be fixedly installed in a vehicle (land vehicle, ship, etc.), in particular in a land vehicle. Said mobile heating device may in particular be designed for the heating of a vehicle interior compartment, for example of a land vehicle, a watercraft or an aircraft, and for the heating of a partially open space such as can be found for example on ships, in particular yachts. The mobile heating device may also be temporarily used in static fashion, for example in large tents, containers (for example building containers), etc. In particular, the mobile heating device may be designed as an engine-independent heater or auxiliary heater for a land vehicle, for example for a caravan, a motorhome, a bus, a passenger motor vehicle, etc.

In the case of the stated evaporator burners, a liquid fuel, which may be formed for example by diesel, gasoline, ethanol or the like, is supplied by way of a fuel supply and is subsequently evaporated and mixed with likewise supplied combustion air in order to form a fuel-air mixture. The fuel-air mixture that is formed is then reacted in an exothermic reaction with a release of heat. To realize reliable evaporation of the liquid fuel, it is important for the evaporation process to be controlled in as effective a manner as possible. Here, in practice, it is a problem in particular that an uncontrolled alternation between desired nucleate boiling and undesired film boiling commonly occurs.

It is an object of the present invention to provide an improved evaporator burner for a mobile heating device.

The object is achieved by way of an evaporator burner for a mobile heating device according to claim 1. Advantageous refinements are specified in the dependent claims.

The evaporator burner for a mobile heating device has: a combustion chamber, a fuel supply line for the supply of a liquid fuel, and an evaporator for the evaporation of supplied fuel. The evaporator has a carrier body which is composed of a non-porous material and which has a fuel preparation surface which faces toward the combustion chamber and which comes into contact with the liquid fuel. A surface structuring with a multiplicity of depressions and elevations is formed into the fuel preparation surface and/or into a rear side, which is averted from said fuel preparation surface, of the carrier body. The surface structuring may be formed into the fuel preparation surface, may be formed into the rear side of the carrier body or in each case one such surface structuring may be formed both into the fuel preparation surface and into the rear side of the carrier body. The fuel preparation surface may for example be formed by a surface of the carrier body, which surface is covered by an evaporator element composed of a porous, absorbent material. In another embodiment, it is however also possible, for example, for the fuel preparation surface to be exposed in the direction of the combustion chamber, and to itself serve as evaporation surface, proceeding from which an evaporation of the fuel occurs. Here, the combustion chamber may in particular also have a mixture preparation region in which no flame is formed during the operation of the evaporator burner and in which pre-mixing of fuel with combustion air to form a fuel-air mixture takes place. In this case, the fuel preparation surface may for example also be arranged entirely or partially in the mixture preparation region. If the fuel preparation surface is equipped with the surface structuring, the surface structuring gives rise to an intensification of the heat transfer from the carrier body to the liquid fuel, which has an advantageous effect on the evaporation process. Here, the surface structuring positively influences the formation, the growth and the transporting-away of vapor bubbles, such that a more stable evaporation process is realized. If the surface structuring is formed into the rear side of the carrier body, an improved introduction of heat into the carrier body is made possible, such that an increased heat flow between the carrier body and the fuel to be evaporated can be achieved.

In one advantageous refinement, the surface structuring is formed into the fuel preparation surface. Here, it is additionally also possible for a surface structuring to be formed into a rear side which is averted from the fuel preparation surface.

In one refinement, the fuel preparation surface is exposed in the direction of the combustion chamber. In this case, the fuel preparation surface itself also serves as an evaporation surface, proceeding from which an evaporation of the fuel takes place. In this case, the surface structuring permits a more stable evaporation process on the fuel preparation surface.

In another refinement, an evaporator element composed of a porous, absorbent material is arranged on the fuel preparation surface. In this case, by way of the surface structuring, it is also the case that an improved mechanical and thermal connection to the evaporator element is provided. The evaporator element may for example have a metal nonwoven, a metal fiber fabric, a sintered metal and/or a sintered ceramic. In a manner known per se, the evaporator element provides a large surface area for the evaporation of the liquid fuel, and promotes a uniform distribution of the fuel.

In one refinement, the evaporator element is pressed against the surface structuring such that the evaporator element is plastically deformed. In this case, a particularly advantageous mechanical and thermal connection between the evaporator element and the carrier body is provided.

In one refinement, a cover is provided on a free end of the evaporator element. In this case, an uncontrolled escape of fuel at the face-side end of the evaporator element can be reliably prevented.

In one refinement, the depressions are in the form of elongate channels and the elevations are in the form of rib-like projections. In this case, the depressions and elevations can be formed into the material of the carrier body in a particularly inexpensive manner by way of one mechanical processing step. The surface structuring may preferably have an undulating or thread-like form as viewed in cross section, in order to permit particularly advantageous fuel preparation. Such a form may in this case be formed particularly inexpensively if the fuel preparation surface is formed by an encircling outer side of a carrier body which projects into the combustion chamber.

In one refinement, the carrier body is in the form of a substantially shell-like evaporator receptacle with a rim surrounding the fuel preparation surface. In this case, a simple and inexpensive implementation of the evaporator burner is made possible.

In another refinement, the carrier body is formed by an elongate body which extends axially into the combustion chamber proceeding from a face wall of the combustion chamber and so as to be spaced apart from a side wall of the combustion chamber, and the outer circumferential surface of which has the fuel preparation surface. In this case, too, the fuel preparation surface may be formed so as to be exposed in the direction of the combustion chamber, or an evaporator element composed of a porous, absorbent material may be arranged on the fuel preparation surface. This refinement of the carrier body makes it possible for a fuel-air mixture to be formed reliably in the case of different delivery rates of the combustion air and of the fuel.

In one refinement, the carrier body has a substantially cylindrical outer circumferential surface. This refinement enables combustion air to flow around in a particularly advantageous manner.

In one refinement, the carrier body has an axial length which corresponds to at least 1.5 times, preferably at least 2 times, the diameter of the carrier body. In this case in particular, reliable formation of the fuel-air mixture is made possible in the case of different levels of heating power of the evaporator burner. The carrier body is preferably arranged in the combustion chamber such that the outer circumferential surface is flowed around by supplied combustion air.

The object is also achieved by way of a mobile heating device having an evaporator burner of said type, according to claim 14. In one refinement, the mobile heating device is in the form of an engine-independent heater or auxiliary heater for a vehicle.

Further advantages and refinements will emerge from the following description of exemplary embodiments with reference to the appended drawings.

Figure 3:
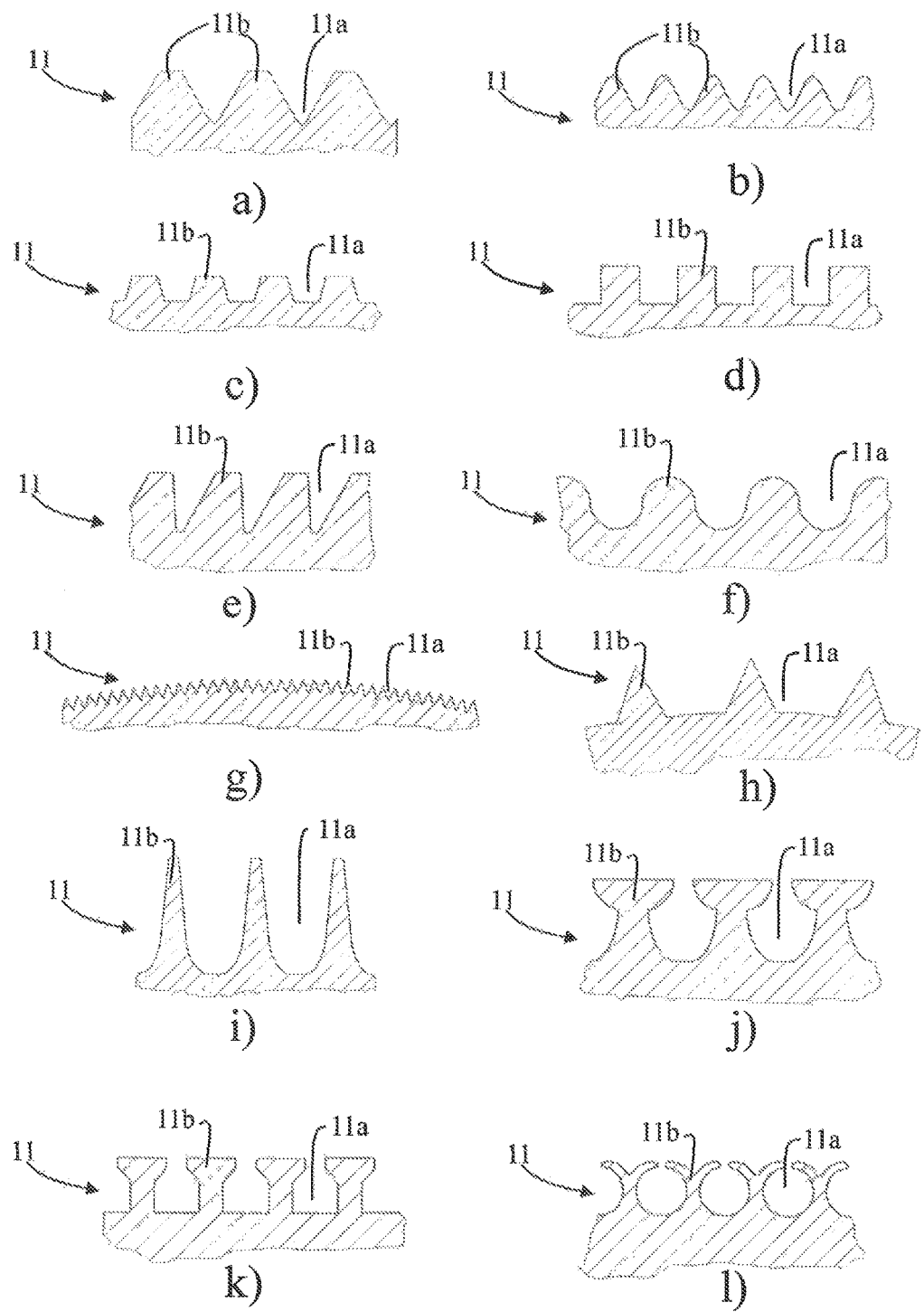

FIGS. 3 a) to l) are schematic illustrations of different configurations of a surface structuring that can be realized in the exemplary embodiment.

Figure 4:
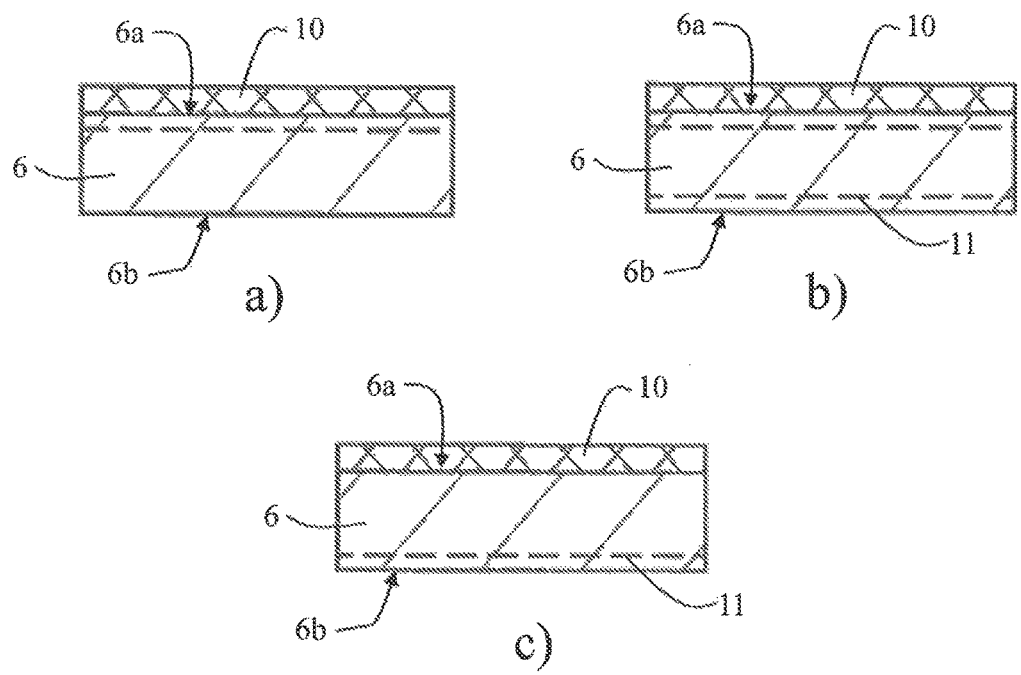

FIGS. 4 a) to c) are schematic partial illustrations of the carrier body in the case of the first embodiment.

Figure 5:
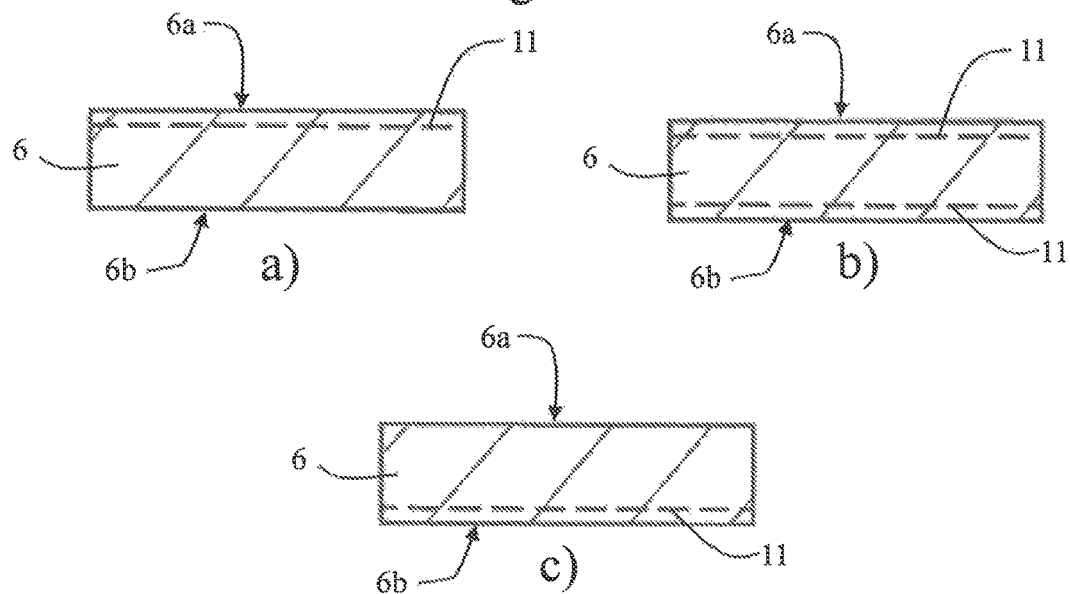

FIGS. 5 a) to c) are schematic partial illustrations of the carrier body in the case of a modification of the first embodiment.

Figure 6:
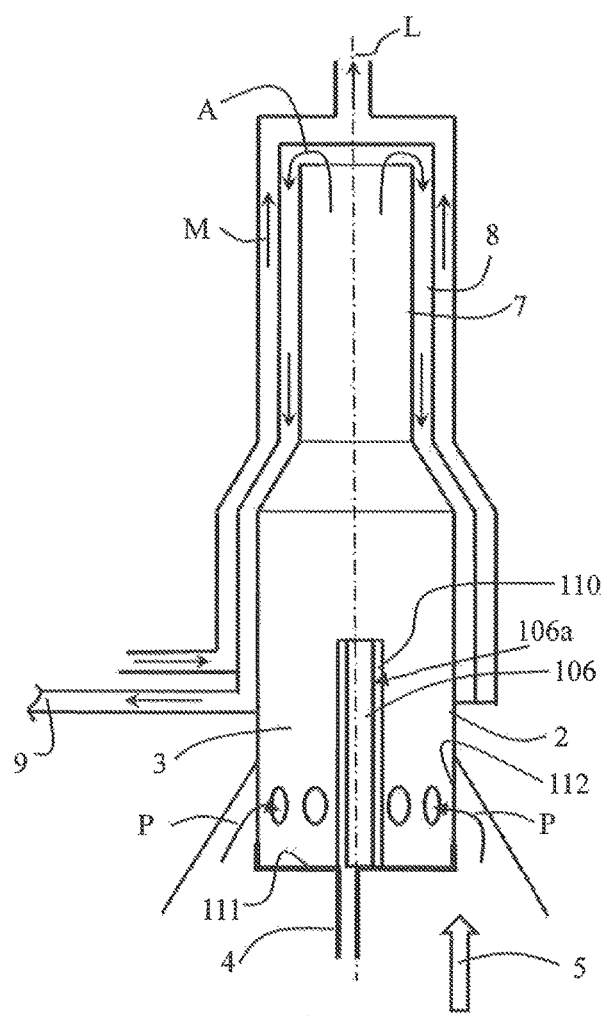

FIG. 6 is a schematic illustration of an evaporator burner according to a second embodiment.

Figure 7:
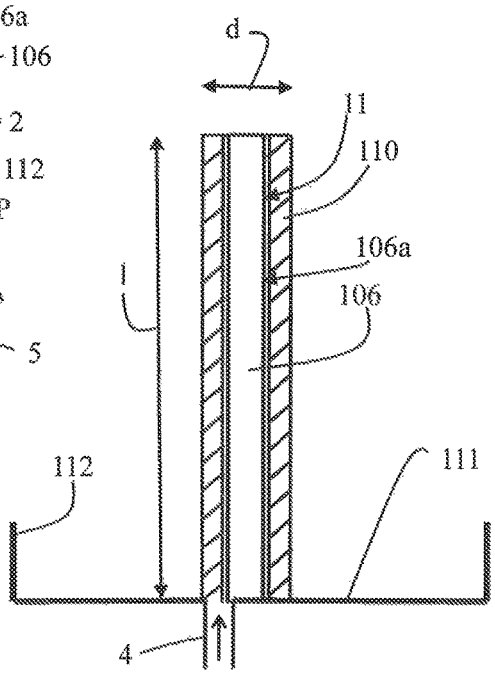

FIG. 7 is a schematic illustration of a carrier body in the case of the second embodiment.

Figure 8:
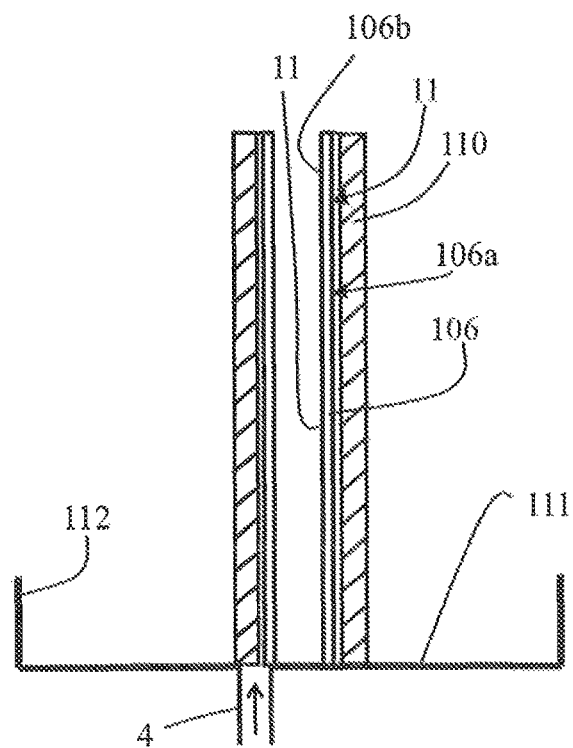

FIG. 8 is a schematic illustration of a carrier body according to a modification of the second embodiment.

Figure 9:
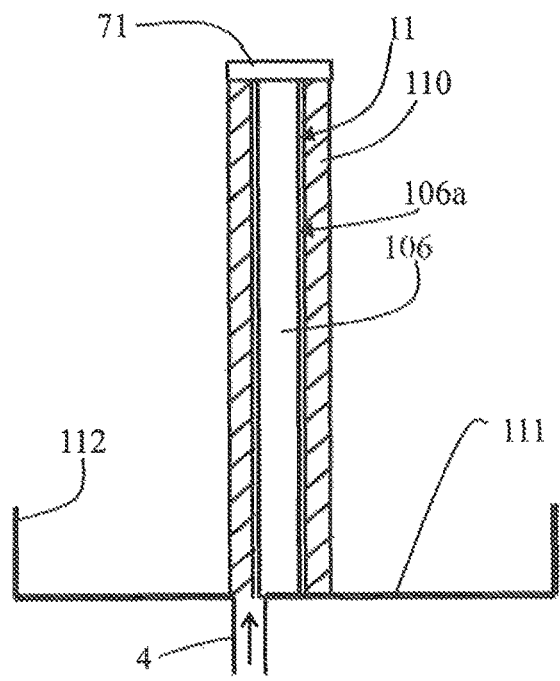

FIG. 9 is a schematic illustration of a carrier body according to a further modification of the second embodiment.

Figure 10:
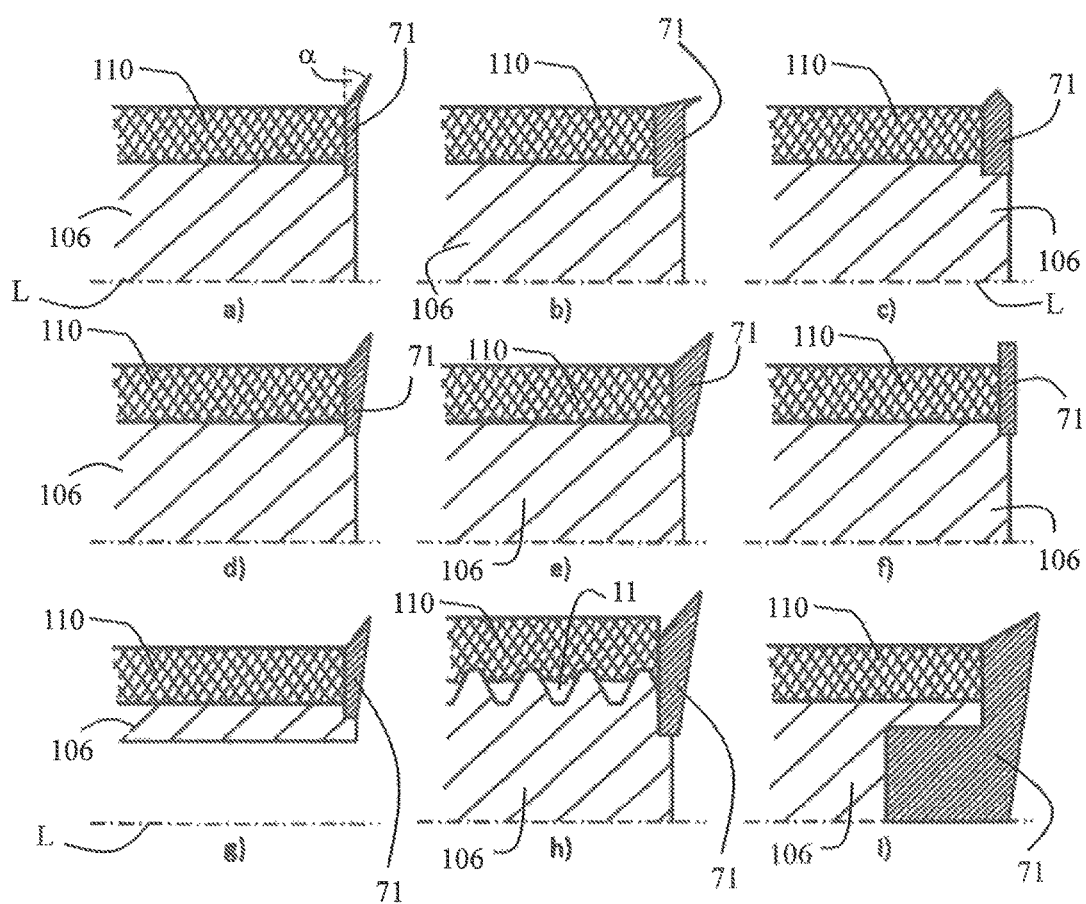

FIGS. 10 a) to i) are schematic illustrations of further modifications of the free end of the carrier body.

FIRST EMBODIMENT

A first embodiment will be described below with reference to FIG. 1 to FIG. 4.

Figure 1:
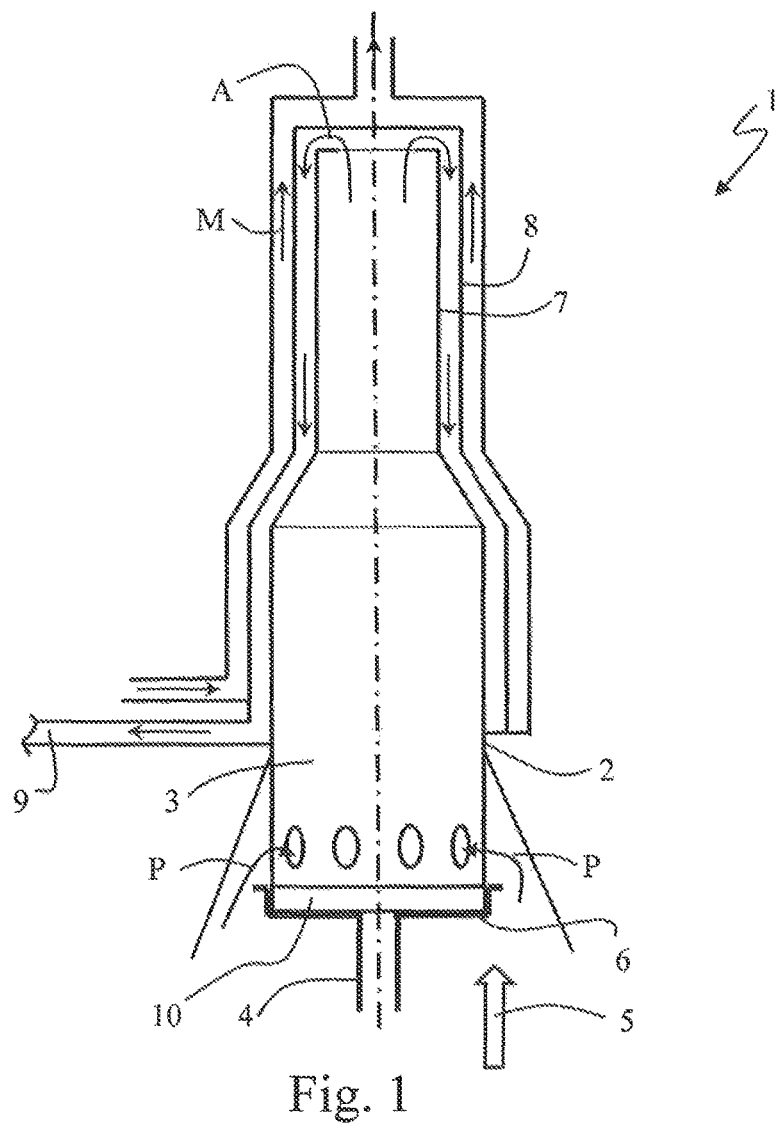
FIG. 1 is a schematic illustration of an evaporator burner according to a first embodiment.

The evaporator burner 1 for a mobile heating device according to the first embodiment, as is schematically illustrated in FIG. 1, is in the form of an evaporator burner for an engine-independent heater or auxiliary heater of a vehicle, in particular of a road-going vehicle.

The evaporator burner 1 according to the first embodiment has a combustion cavity 2 in which there is formed a combustion chamber 3 in which a reaction of a fuel-air mixture with a release of heat takes place. The evaporator burner 1 has a fuel supply line 4 for the supply of a liquid fuel. The liquid fuel may in this case be formed in particular by a fuel which is also used for the operation of an internal combustion engine of the vehicle, in particular by gasoline, diesel, ethanol or the like. The fuel supply line 4 may in particular be connected, in a manner known per se, to a fuel delivery device (not illustrated) by way of which the liquid fuel can be delivered. The fuel delivery device may in this case be formed in particular by a fuel dosing pump.

Furthermore, a combustion air supply 5 (merely schematically illustrated in FIG. 1) is provided for the supply of combustion air into the combustion chamber 3. In FIG. 1, combustion air entering the combustion chamber 3 is indicated schematically by arrows P. In a manner known per se, the combustion air supply 5 has a combustion air delivery device (not illustrated) which may be formed for example by blower.

In the exemplary embodiment, the combustion chamber 3 is closed off at a face side by a carrier body 6 composed of a solid, non-porous material, which carrier body is in the form of a shell-like evaporator receptacle. The fuel supply line 4 opens out at the carrier body 6 such that liquid fuel can be supplied to the carrier body 6. During the operation of the evaporator burner 1, an evaporation of the supplied liquid fuel takes place. The evaporated fuel is mixed with the combustion air supplied via the combustion air supply 5 in order to form a fuel-air mixture, and is reacted in the combustion chamber 3 with, a release of heat. The hot combustion exhaust gases A flow out via a combustion pipe 7, which is positioned downstream of the combustion chamber 3, and flow through a heat exchanger 8, in which at least a part of the released heat is transferred to a medium M to be heated. The medium to be heated may in this case be formed by air to be heated, in particular for an interior compartment of a vehicle, or by cooling liquid in a cooling liquid circuit of a vehicle. In the exemplary embodiment illustrated, the medium M to be heated flows, in the heat exchanger 8, in the opposite direction to the hot combustion exhaust gases A. After passing through the heat exchanger 8, the combustion exhaust gases A are discharged through an exhaust-gas outlet 9.

Figure 2:
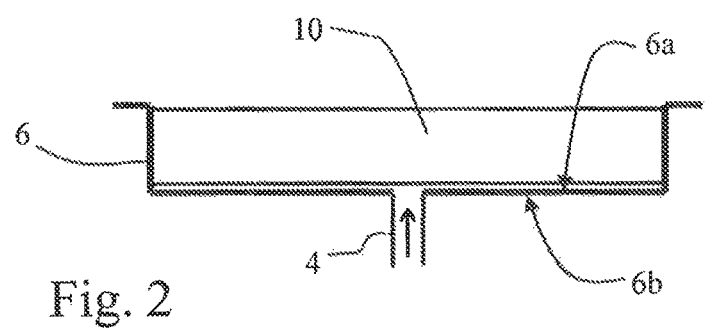
FIG. 2 is a schematic illustration of a carrier body, which is in the form of a shell-like evaporator receptacle, in the case of the first embodiment.

The carrier body 6 has a fuel preparation surface 6a, which faces toward the combustion chamber 3, and a rear side 6b, which is averted from said combustion chamber. In the first embodiment, an evaporator element 10 composed of a porous, absorbent material is arranged on the carrier body 6 which is the form of a shell-like evaporator receptacle, which evaporator element covers the fuel preparation surface 6a. The evaporator element 10 may in this case be formed in particular from a metal nonwoven, a metal fiber fabric, a sintered metal and/or a sintered ceramic. Even though FIG. 1 and FIG. 2 schematically illustrate a single-layer structure of the evaporator element 10, said evaporator element may also have a multi-layer structure.

In the first exemplary embodiment, a surface structuring 11 with a multiplicity of depressions 11a and elevations 11b is formed in the fuel preparation surface 6a of the carrier body 6, as is schematically illustrated by dashed lines in FIG. 4a). Exemplary configurations of the surface structuring 11 are illustrated in FIGS. 3a) to 3l). FIGS. 3a) to 3l) each illustrate exemplary sections through different configurations of the surface structuring 11. Here, the depressions 11a preferably extend as elongate channels along the surface of the carrier body 6, and the elevations 11b extend as rib-like projections along the surface of the carrier body 6.

In a preferred refinement, the evaporator element 10 is pressed against the surface structuring 11 so as to be slightly plastically deformed. In this way, particularly advantageous thermal and mechanical coupling of the evaporator element 10 to the carrier body 6 is ensured. By way of the surface structuring 11, good heat transfer from the carrier body 6 to the evaporator element is provided, which permits a particularly controlled evaporation of fuel.

Modifications

FIG. 4b) schematically illustrates a first modification of the first embodiment, in which both the fuel preparation surface 6a, which faces toward the combustion chamber 3, and the rear side 6b, which is averted from said fuel preparation surface, of the carrier body 6 are each equipped with a surface structuring 11. Owing to the surface structuring 11 formed into the rear side 6b, it is possible to realize improved heat transfer to the carrier body 6 via the rear side 6b, whereby the evaporation process can be additionally optimized. The surface structuring 11 may in this case again be designed, for example, as schematically illustrated in FIG. 3a) to FIG. 3l).

FIG. 4c) schematically illustrates a second modification of the first embodiment, in which a surface structuring 11 is formed only into the rear side 6b of the carrier body 6, and the fuel preparation surface 6a is not equipped with a surface structuring 11 of said type.

In a further modification of the first embodiment, the fuel preparation surface 6a of the carrier body 6 is not covered by an additional evaporator element 10, but rather the fuel preparation surface 6a is itself formed as an evaporation surface, which is arranged so as to be exposed in relation to the combustion chamber 3 and proceeding from which the evaporation of the fuel takes place. In this modification, too, the surface structuring 11 may be formed only in the fuel preparation surface 6a, as is schematically illustrated in FIG. 5a), surface structurings 11 may be formed in each case both in the fuel preparation surface 6a and in the rear side 6b of the carrier body 6, as is schematically illustrated in FIG. 5b), or else a surface structuring 11 of said type may be formed only in the rear side 6b of the carrier body 6, as is schematically illustrated in FIG. 5c).

Even though only a carrier body 6 with a planar fuel preparation surface 6a has been described with reference to the first exemplary embodiment, other configurations are also possible; in particular, it is also possible for the fuel preparation surface 6a to have a curved form, for example also to be formed by the encircling outer side of a, for example, cylindrical or narrowing carrier body, or to be formed by the encircling inner side of a, for example, hollow cylindrical or hollow conical carrier body.

Here, as is schematically illustrated for example in FIG. 3a) to FIG. 3l), the surface structuring 11 may be in the form of a repeating pattern or may for example have an irregular structure. The profile of the surface structuring 11 may in this case have different forms.

The surface structuring 11 may be formed in particular by way of cutting processing methods, by way of deformation processing methods, or by way of primary forming processing methods.

Owing to the described surface structuring 11, improved fuel preparation in the case of heating devices operated with liquid fuel is made possible, which in turn leads to more stable operation and consequently to a lengthened service life of the evaporator burner. Here, during the fuel preparation, an improvement of the heat transfer into the liquid fuel is provided, whereby better control of the fuel heating and evaporation is realized, and random alternation between nucleate boiling and film boiling can be prevented. Furthermore, in this way, the dwell time for the fuel preparation can be reduced, whereby the formation of deposits is reduced.

In the case of the surface structuring 11 being formed in the fuel preparation surface 6a, the wettability and, in association therewith, the fuel distribution are improved. Furthermore, the number of nucleation points for desired nucleate boiling is increased, such that undesired film boiling can be prevented in a more reliable manner. In combination with a separate evaporator element 10, improved thermal and mechanical coupling between the carrier body 6 and the evaporator element 10 is realized, and in the context of an assembly process, it is possible for even relatively great tolerance fluctuations to be reliably compensated.

SECOND EMBODIMENT

A second embodiment of an evaporator burner 101 will be described below with reference to FIG. 6 and FIG. 7. The evaporator burner 101 as per the second embodiment differs from the evaporator burner 1 as per the first embodiment merely with regard to the configuration of the carrier body and of the evaporator element optionally arranged thereon, such that, below, the same reference designations will be used to denote the corresponding components, and the description of said components will not be repeated.

In the case of the evaporator burner 101 as per the second embodiment, a carrier body 106 is arranged, instead of the shell-like carrier body 6, in the combustion chamber 3.

Even though the schematic illustration shows an arrangement of the carrier body 106 in a region of the combustion chamber 3 in which a flame is formed during the operation of the evaporator burner 101, it is for example also possible for the carrier body 106 to be arranged entirely or partially in a mixture preparation region in which mixing of combustion air and fuel to form a fuel-air mixture takes place but no reaction of the fuel-air mixture takes place during the operation of the evaporator burner 101. Even though a combustion involving a flame has been described in each case with regard to the embodiments, it is also possible for the evaporator burner to be designed such that a partially or fully catalytic reaction of the fuel-air mixture is performed.

The carrier body 106 according to the second embodiment extends into the combustion chamber 3 substantially parallel to a longitudinal axis L of the evaporator burner 101 proceeding from a face wall 111 of the combustion chamber 3 and so as to be spaced apart from a side wall 112 of the combustion chamber 3. In the embodiment schematically illustrated in FIG. 4, it is the case here that the carrier body 106 extends concentrically with respect to the longitudinal axis L, which is basically preferable, though arrangements deviating from this are also possible.

The carrier body 106 has an elongate form with a length l which is considerably greater than a diameter d of the carrier body 106. Here, the length l preferably corresponds to at least 1.5 times the diameter d, more preferably to at least 2 times said diameter. In the illustrated embodiment, the carrier body 106 is formed by a solid cylindrical body. Other configurations are however for example also possible; for example, the carrier body 106 may also narrow or widen toward one end.

The carrier body 106 has a fuel preparation surface 106a which, in the second embodiment, is formed by the substantially cylindrical outer circumferential surface of the carrier body 106. Even though FIG. 6 and FIG. 7 illustrate an embodiment in which the entire outer circumferential surface is in the form of a fuel preparation surface 106a, it is for example also possible for the fuel preparation surface 106a to extend only over a subregion of the outer circumferential surface of the carrier body 106.

In the embodiment schematically illustrated in FIG. 6 and FIG. 7, the fuel preparation surface 106a is covered by an evaporator element 110 composed of a porous, absorbent material. The evaporator element 110 may for example in turn be formed from a metal nonwoven, a metal fiber fabric, a sintered metal and/or a sintered ceramic. The evaporator element 110 may in this case be of single-layer or multilayer form, as in the first embodiment.

In the second embodiment, the evaporator element 110 has a substantially hollow cylindrical form and bears by way of an inner surface against the fuel preparation surface 106a of the carrier body 106. In the second embodiment, too, the evaporator element 110 may be pressed against the carrier body 106 such that the evaporator element 110 is plastically deformed, as has been described with reference to the first embodiment. This may be realized for example by way of a pressing-on, pushing-on or turning-on action or by way of sintering, welding etc.

In the case of the evaporator burner 101, the fuel supply line 4 opens out at the face side 111 such that the liquid fuel is supplied to the fuel preparation surface 106a of the carrier body 106 and to the evaporator element 110. During the operation of the evaporator burner 101, the supplied combustion air flows around the carrier body 106, and in the process, the supplied combustion air mixes with evaporating fuel to form a fuel-air mixture. Here, the combustion air may preferably be supplied with a tangential direction component or with a swirl in order to realize an improved flow around the carrier body 106.

In the case of the second embodiment, too, a surface structuring 11 with a multiplicity of elevations and depressions is formed into the fuel preparation surface 106a, which surface structuring may be designed as has been described above with regard to the first embodiment. In particular, the surface structuring 11 may have a cross-sectional form as is schematically illustrated in FIG. 3a) to FIG. 3l).

Here, the configuration of the fuel preparation surface 106a with the surface structuring 11 in the second embodiment realizes the same advantages that have already been described with regard to the first embodiment.

Even though, with regard to FIG. 6 and FIG. 7, an exemplary embodiment has been described in which the evaporator element 110 is arranged on the fuel preparation surface 106a, it is also possible in the second embodiment for the fuel preparation surface 6a to be formed so as to be exposed in the direction of the combustion chamber 3 and to itself serve as an evaporation surface, without a separate evaporator element 110 being provided.

During the operation of the evaporator burner 101 as per the second embodiment, the supplied liquid fuel emerges from the fuel supply line 4 at a face side and wets the fuel preparation surface 106a proceeding from there. Owing to the large axial extent of the carrier body 106 and of the fuel preparation surface 106a, it is the case that good mixing of fuel with combustion air to form a fuel-air mixture is realized in each case even in the presence of different levels of heating power of the evaporator burner 101, that is to say in the case of different fuel supply rates and combustion air supply rates.

Here, the carrier body 106 simultaneously serves for supplying the heat energy required for the evaporation process, by heat conduction, from the hot region of the combustion chamber 3 in which a flame is formed during operation. Here, the fuel preparation surface 106a serves as a heating surface which assists the evaporation of the liquid fuel.

Modification

A modification of the second embodiment is schematically illustrated in FIG. 8. In the modification of the second embodiment, the carrier body 106 is not in the form of a solid component but is in the form of a hollow body with an internal cavity. Thus, the carrier body 106 according to the modification of the second embodiment has not only the fuel preparation surface 106a facing toward the combustion chamber 3 but also a rear side 106b averted from said fuel preparation surface. The rear side 106b in the modification is in this case formed by the inner circumferential surface of the substantially hollow cylindrical carrier body 106.

As in the first embodiment and the modifications thereof, it is also possible in the modification of the second embodiment for the described surface structuring 11 to be provided only in the fuel preparation surface 106a, for a surface structuring 11 of said type to be formed only in the rear side 106b, or for surface structurings 11 of said type to be formed in each case both in the fuel preparation surface 106a and in the rear side 106b averted therefrom, as is schematically illustrated in FIG. 8.

Here, the modifications described above with reference to the first embodiment are in each case correspondingly also possible in the second embodiment.

Further Modifications

FIG. 9 schematically illustrates a further modification of the evaporator burner 101 illustrated in FIG. 6 and FIG. 7. The further modification differs from the above-described second embodiment merely in that the carrier body 106 is, at its free end, equipped with an additional cover 71. Since the further components do not differ from the above-described second embodiment, the same reference designations are used for the further modification as for the second embodiment, and, in order to avoid repetitions, not the entire construction of the evaporator burner 101 will be described again.

The cover 71 is arranged on the free end of the carrier body 106 such that liquid fuel and also excess fuel vapor cannot emerge in the axial direction at the face side of the carrier body 106 but is forced to emerge from the evaporator element 110 in the radial direction. As schematically illustrated in FIG. 9, there is provided on the free face side of the carrier body 106 a cover 71 which projects in the radial direction from the outer circumference of the rest of the carrier body 106 and which covers the free face side of the evaporator element 110. The cover 71 is formed from an at least substantially impermeable material such that liquid fuel and fuel vapor cannot pass through the cover 71. The cover 71 may preferably be formed from metal, in particular from temperature-resistant high-grade steel. The cover 71 may for example be in the form, of a separate covering disk which is fastened non-detachably or detachably to the face-side end of the carrier body 106. In another configuration, it is for example also possible for the cover 71 to be produced in one piece with the carrier body 106 from the same material.

The cover 71 serves to prevent fuel or fuel vapor from emerging in particular to an increased extent at the free end of the carrier body 106 from the evaporator element 110. In the case of the carrier body 106 being arranged in a mixture preparation region in which no reaction of fuel-air mixture takes place, it is achieved in this way that the fuel is supplied at least substantially entirely to the mixture preparation region for the formation of the fuel-air mixture. Furthermore, adverse influencing of the flame anchoring in the combustion chamber is prevented.

Even though FIG. 9 merely schematically shows the arrangement of the described cover 71 in relation to a substantially solid carrier body 106, it is for example also possible for a cover 71 of said type to additionally also be provided in the first modification, illustrated in FIG. 8, of the second embodiment. In this case, the cover 71 then preferably has a substantially ring-like form with a central aperture, the diameter of which may in particular substantially correspond to the diameter of the internal cavity in the carrier body 106.

FIGS. 10 a) to i) schematically illustrate various further modifications of the cover 71. Said further modifications of the coyer 11 may also in each case be provided both in the case of a substantially solid carrier body 106 and in the case of a carrier body 106 with an internal cavity.

In the further modifications of the cover 71 illustrated in FIGS. 10 a) to i), the cover 71 projects in the radial direction in each case beyond the outer circumference of the evaporator element 110 and provides an at least substantially sharp separation edge for the flow passing along the outer circumference of the carrier body 106 and of the evaporator element 110. As is schematically illustrated in FIG. 10 a), that region of the cover 71 which projects in the radial direction extends at an angle α relative to a plane which runs perpendicular to the longitudinal axis L. Here, depending on the desired flow guidance, the angle α may have a value between 0° and 90°.

In the modification schematically illustrated in FIG. 10 a), that region of the cover 71 which projects in the radial direction extends for example at an angle α in the range between 35° and 45°, such that the gases flowing along the outer circumference of the evaporator element 110 are diverted radially outward there in a relatively intense manner. Furthermore, in the case of this modification, the projecting region is in the form of a lip which tapers in the radial direction and which projects both in the radial direction and in the axial direction. The projecting region is in this case angled slightly in the direction of the main flow direction in relation to the rest of the cover 71.

In the modification schematically illustrated in FIG. 10 b), that region of the cover 71 which projects in the radial direction extends at a considerably greater angle α, which amounts to between 160° and 170°, such that the uses flowing along the outer circumference of the evaporator element 110 are subjected to a considerably less pronounced radial deflection.

In the case of the modification schematically illustrated in FIG. 10 c), that region of the cover which projects in the radial direction extends for example at an angle of between approximately 40° and 50°. Furthermore, in the case of this modification, the projecting region of the cover 71 is also beveled or chamfered on the side averted from the evaporator element 110 in order to influence the flow separation in a targeted manner.

In the case of the modifications schematically illustrated in FIGS. 10 d) and 10 e), the cover 71 has in each case an altogether more wedge-shaped cross section such that the projecting region of the cover 71 is—by contrast to the modifications of FIG. 10 a) and FIG. 10 b)—not of angled form in relation to the rest of the cover 71. As is evident from a comparison of the modifications as per FIGS. 10 a) and b) and the modifications as per FIGS. 10 d), 10 e) and 10 i), the wedge angle of the radially projecting region of the cover 71 can be set in targeted fashion in this way.

In the modification schematically illustrated in FIG. 10 f), the cover 71 is in the form of a substantially ring-shaped disk on the end of the carrier body 106, such that the projecting region of the cover projects laterally at an angle α of approximately 0°.

In the case of the modification schematically illustrated in FIG. 10 g), the carrier body 106 is provided with an internal cavity which is formed so as to be open in the direction of the combustion chamber 3. In this case, it is for example possible for gases from the combustion chamber 3 to flow into the interior of the carrier body 106. Said additional features may for example also be provided in the other modifications.

FIG. 10 h) illustrates, by way of example, a surface structuring of the outer circumference of the carrier body 106. In the case of the modification of FIG. 10 h), the cover 71 furthermore bears, in a region situated radially at the inside, directly at a face side against the evaporator element 110, and runs at an angle α of approximately 0°. By contrast, a region of the cover 71 situated further to the outside runs at a relatively large angle α, such that, in turn, a radially projecting, tapering lip is formed. Furthermore, in a region of the evaporator element 110 situated radially at the outside, the cover 71 in this case does not bear directly against the evaporator element 110. These supplementary features of the modification of FIG. 10 h) may furthermore also be realized in the other modifications.

In the modification schematically illustrated in FIG. 10 i), the cover 71 is in the form of an insert which is inserted with a central protruding peg into a face-side recess of the carrier body 106. These further features may in each case also be realized in the other modifications.

Even though a surface structuring 11 of the outer circumference of the carrier body 106 has been illustrated only in FIG. 10 h), this may preferably also likewise be provided in the other illustrations as per FIGS. 10 a) to g) and i). The configuration of the cover 71 with the separation edge described here has the further advantage that the flow in the combustion chamber 3 is stabilized even more effectively. Inter alia, it is possible in this way for the generation of pulsations in the combustion chamber 3 to be prevented. Furthermore, backfiring of the flame into the upstream region of the combustion chamber 3 can be prevented in an effective manner, in particular in the situation in which the combustion chamber 3 has a mixture preparation region in which no flame should form during operation.

Even though special configurations of the carrier body 6, 106 have been described with reference to the described embodiments, yet further configurations are also possible. In particular, the carrier body may also be formed by a hollow body, the inner side of which faces toward the combustion chamber 3 and is in the form of a fuel preparation surface, such that the inner side of the carrier body for example simultaneously forms an outer wall of the combustion chamber 3 or of a part, formed as a mixture preparation region, of the combustion chamber. The various modifications described above are possible in the case of such a configuration too.

The invention claimed is:

1. An evaporator burner for a mobile heating device, said burner comprising:
   a combustion chamber;
   a fuel supply line supplying a liquid supplied fuel for the combustion chamber; and
   an evaporator evaporating the supplied fuel, wherein the evaporator has a carrier body including a non-porous material and which has a fuel preparation surface which faces toward the combustion chamber and which comes into contact with the liquid fuel, wherein a surface structuring with a multiplicity of depressions and elevations is formed into the fuel preparation surface and/or into a rear side, which is averted from said fuel preparation surface, of the carrier body.

2. The evaporator burner as claimed in claim 1, wherein the surface structuring is formed into the fuel preparation surface.

3. The evaporator burner as claimed in claim 1, wherein the fuel preparation surface is exposed in the direction of the combustion chamber.

4. The evaporator burner as claimed in claim 1, wherein an evaporator element including a porous, absorbent material is arranged on the fuel preparation surface.

5. The evaporator burner as claimed in claim 4, wherein the evaporator element is pressed, with plastic deformation of the evaporator element, against the surface structuring.

6. The evaporator burner as claimed in claim 4, wherein a cover is provided on a free end of the evaporator element.

7. The evaporator burner as claimed in claim 1, wherein the depressions are elongate channels and the elevations are rib-like projections.

8. The evaporator burner as claimed in claim 1, wherein the surface structuring has an undulating or thread-like form as viewed in cross section.

9. The evaporator burner as claimed in claim 1, wherein the carrier body is a substantially shell-like evaporator receptacle with a rim surrounding the fuel preparation surface.

10. The evaporator burner as claimed in claim 1, wherein the carrier body is an elongate body which extends axially into the combustion chamber proceeding from a face wall of the combustion chamber and so as to be spaced apart from a side wall of the combustion chamber, and the outer circumferential surface of which has the fuel preparation surface.

11. The evaporator burner as claimed in claim 10, wherein the carrier body has a substantially cylindrical outer circumferential surface.

12. The evaporator burner as claimed in claim 10, wherein the carrier body has an axial length which corresponds to at least 1.5 times the diameter (d) of the carrier body.

13. The evaporator burner as claimed in claim 10, wherein the carrier body is arranged in the combustion chamber such that supplied combustion air flows around the outer circumferential surface.

14. A mobile heating device, having an evaporator burner as claimed in claim 1.

15. The mobile heating device as claimed in claim 14, which heating device is an engine-independent heater or auxiliary heater for a vehicle.

* * * * *

UNITED STATES PATENT AND TRADEMARK OFFICE
CERTIFICATE OF CORRECTION

PATENT NO. : 10,113,742 B2
APPLICATION NO. : 15/127342
DATED : October 30, 2018
INVENTOR(S) : Vitali Dell et al.

Page 1 of 1

It is certified that error appears in the above-identified patent and that said Letters Patent is hereby corrected as shown below:

In the Specification

Column 4, Line 52-53, "by blower" should be --by a blower--.

Column 10, Line 11-12, "the uses flowing" should be --the gases flowing--.

Signed and Sealed this
Twenty-fifth Day of December, 2018

Andrei Iancu
*Director of the United States Patent and Trademark Office*